US011371492B2

(12) United States Patent
Luczak

(10) Patent No.: US 11,371,492 B2
(45) Date of Patent: Jun. 28, 2022

(54) PISTON-VALVE ENGAGEMENT IN FLUID SPRAYERS

(71) Applicant: Graco Minnesota Inc., Minneapolis, MN (US)

(72) Inventor: Mariusz J. Luczak, Elk River, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 79 days.

(21) Appl. No.: 16/540,861

(22) Filed: Aug. 14, 2019

(65) Prior Publication Data
US 2019/0368476 A1 Dec. 5, 2019

Related U.S. Application Data

(63) Continuation of application No. 15/704,649, filed on Sep. 14, 2017, now Pat. No. 10,422,325.

(51) Int. Cl.
*F04B 7/04* (2006.01)
*F04B 49/03* (2006.01)
(Continued)

(52) U.S. Cl.
CPC .............. *F04B 7/04* (2013.01); *B05B 9/0413* (2013.01); *B05B 9/0861* (2013.01); *F04B 1/02* (2013.01);
(Continued)

(58) Field of Classification Search
CPC ...... F04B 23/028; F04B 53/101; F04B 1/143; F04B 1/182; F04B 1/02; F04B 7/04;
(Continued)

(56) References Cited

U.S. PATENT DOCUMENTS 766,416 A 8/1904 Booth
1,196,584 A 8/1916 Randolph
(Continued)

FOREIGN PATENT DOCUMENTS

CN 202951592 U 5/2013
CN 103930218 A 7/2014
(Continued)

OTHER PUBLICATIONS

First Chinese Office Action for CN Application No. 2019105194152, dated Sep. 2, 2020, pp. 16.
(Continued)

*Primary Examiner* — Nathan C Zollinger
*Assistant Examiner* — Timothy P Solak
(74) *Attorney, Agent, or Firm* — Kinney & Lange, P. A.

(57) ABSTRACT

A pump draws fluid from a reservoir and drives the fluid downstream to a spray tip where the fluid is applied to a surface. A piston is driven in a reciprocating manner to pump the fluid. A check valve is disposed downstream of the piston to regulate a flow of the fluid downstream from the piston. The pump is initially dry and is primed with fluid prior to operation. To facilitate priming, the piston is dimensioned to impact the ball and unseat a valve member of the check valve during a priming stroke, thereby ejecting any air from the pump through the check valve. With the air ejected from the pump, a vacuum is formed during a suction stroke of the piston, which draws fluid downstream from the reservoir to prime the pump.

19 Claims, 11 Drawing Sheets

Related U.S. Application Data

(60) Provisional application No. 62/394,624, filed on Sep. 14, 2016.

(51) Int. Cl.

| | | |
|---|---|---|
| *F04B 1/182* | (2020.01) | |
| *F04B 1/143* | (2020.01) | |
| *F04B 53/10* | (2006.01) | |
| *F04B 53/06* | (2006.01) | |
| *B05B 9/04* | (2006.01) | |
| *B05B 9/08* | (2006.01) | |
| *F04B 1/02* | (2006.01) | |
| *F04B 23/02* | (2006.01) | |
| *F16K 15/04* | (2006.01) | |
| *F04B 1/146* | (2020.01) | |
| *F04B 17/06* | (2006.01) | |

(52) U.S. Cl.
CPC .............. *F04B 1/143* (2013.01); *F04B 1/182* (2013.01); *F04B 23/028* (2013.01); *F04B 49/03* (2013.01); *F04B 53/06* (2013.01); *F04B 53/101* (2013.01); *F04B 53/1087* (2013.01); *F16K 15/044* (2013.01); *F04B 1/146* (2013.01); *F04B 17/06* (2013.01)

(58) Field of Classification Search
CPC .......... F04B 49/03; F04B 53/06; F04B 17/06; F04B 39/06
See application file for complete search history.

(56) References Cited

U.S. PATENT DOCUMENTS

| | | | |
|---|---|---|---|
| 1,516,814 A | 11/1924 | Flynn | |
| 2,131,749 A | 10/1938 | Ofeldt | |
| 2,481,183 A * | 9/1949 | Welby | F04B 9/02 |
| | | | 417/443 |
| 3,248,022 A | 4/1966 | Schulman et al. | |
| 3,310,000 A * | 3/1967 | Martin | F04B 7/04 |
| | | | 417/491 |
| 3,411,703 A | 11/1968 | Zengel | |
| 3,468,257 A | 9/1969 | Kofink | |
| 3,893,627 A * | 7/1975 | Siczek | B05B 9/0861 |
| | | | 239/533.15 |
| 3,894,816 A * | 7/1975 | Davis | F04B 43/009 |
| | | | 417/454 |
| 4,480,964 A | 11/1984 | Skinner | |
| 4,629,400 A | 12/1986 | Porel | |
| 4,743,179 A * | 5/1988 | Waas | F04B 17/042 |
| | | | 417/417 |
| 4,883,467 A | 11/1989 | Franetzki et al. | |
| 5,306,122 A | 4/1994 | Gebauer et al. | |
| 5,971,107 A * | 10/1999 | Stitz | F16C 33/583 |
| | | | 184/7.4 |
| 6,149,125 A | 11/2000 | Nilsson | |
| 7,540,721 B2 | 6/2009 | Liedtke et al. | |
| 8,366,408 B2 | 2/2013 | Wago et al. | |
| 9,103,456 B1 | 8/2015 | Rains | |
| 2009/0045271 A1 | 2/2009 | Alexander et al. | |
| 2010/0072300 A1* | 3/2010 | Miller | B05B 9/0416 |
| | | | 239/332 |
| 2011/0198413 A1* | 8/2011 | Thompson | B05B 9/043 |
| | | | 239/322 |
| 2013/0277455 A1 | 10/2013 | Thompson et al. | |
| 2014/0339329 A1* | 11/2014 | Lawrence | B05B 14/00 |
| | | | 239/127 |

FOREIGN PATENT DOCUMENTS

| | | |
|---|---|---|
| CN | 103977922 A | 8/2014 |
| CN | 104043549 A | 9/2014 |
| CN | 204307752 U | 5/2015 |
| EP | 0218840 A2 | 4/1987 |
| EP | 0408865 A2 | 5/1990 |
| WO | WO03045572 A1 | 6/2003 |
| WO | WO2010047800 A2 | 4/2010 |
| WO | WO2015086085 A1 | 6/2015 |

OTHER PUBLICATIONS

First Chinese Office Action for CN Application No. 2017108293377, dated Sep. 13, 2019, pp. 17.
Extended European Search Report for EP Application No. 17191188.6, dated Feb. 8, 2018, pp. 8.
Communication Pursuant to Article 94(3) EPC for EP Application No. 17191188.6, dated Mar. 26, 2020, pp. 4.
Extended European Search Report for EP Application No. 21159357.9, dated Jun. 10, 2021, pp. 8.
Second Chinese Office Action for CN Application No. 2019105194152, dated May 26, 2021, pp. 7.

* cited by examiner

PISTON-VALVE ENGAGEMENT IN FLUID SPRAYERS

CROSS-REFERENCE TO RELATED APPLICATION(S)

This application is a continuation of U.S. application Ser. No. 15/704,649 filed Sep. 14, 2017 for "PISTON-VALVE ENGAGEMENT IN FLUID SPRAYERS" by M. J. Luczak, now U.S. Pat. No. 10,422,325, which in turn claims the benefit of priority to U.S. Provisional Application No. 62/394,624 filed Sep. 14, 2016, and entitled "PISTON-VALVE ENGAGEMENT IN FLUID SPRAYERS," the disclosure of which is hereby incorporated in its entirety.

BACKGROUND

This disclosure generally relates to fluid sprayers. More particularly, this disclosure relates to fluid sprayer pumps.

Sprayers pull fluid from a fluid source and apply the fluid to a surface through a nozzle. The sprayer includes a pump that pulls the fluid from the fluid source and drives the fluid downstream to the nozzle. Prior to operating the sprayer, the pump is dry and must be primed. When the pump is dry, air is disposed within pump cylinders between the check valves and the pistons, which hinders the proper uptake of fluid by the pump. The piston can compress the air, but the air pressure can be insufficient to overcome the force maintaining the check valve in the closed position, such as surface tension of sticky residue from a previous use. When the check valve is stuck in the closed position, a user removes the check valve from the pump and manually manipulates the check valve so air can be ejected through the check valve during priming.

SUMMARY

According to an aspect of the disclosure, a pump includes a first piston disposed within a first axial bore of a pump body and a first check valve disposed at an exit of the first axial bore. The first piston has a downstream end movable within the first axial bore. The first check valve includes a first valve member. The downstream end of the first piston is configured to impact the first valve member to drive the first valve member from a closed position to an open position.

According to another aspect of the disclosure, a sprayer includes a sprayer body, a spray tip attached to the sprayer body and configured to spray a fluid, a reservoir connected to the sprayer body and configured to store a supply of the fluid, and a pump disposed within the sprayer body and configured to draw the fluid from the reservoir and drive the fluid downstream to the spray tip. The pump includes a pump body mounted within the sprayer body, a piston, and a check valve. The pump body includes an axial bore and an inlet channel configured to fluidly connect the axial bore and the reservoir. The piston extends into the axial bore and has a downstream end configured to reciprocate within the axial bore. The check valve is disposed within the axial bore downstream of the piston and includes a valve member. The downstream end of the piston is configured to impact the valve member to drive the valve member from a closed position to an open position.

According to yet another aspect of the disclosure, a method of priming a pump includes driving a piston through a priming stroke; impacting a valve member with the piston to drive the valve member from a closed position to an open position; and pulling the piston through a suction stoke.

DETAILED DESCRIPTION

Sprayers according to the present disclosure spray various fluids, examples of which include paint, water, oil, stains, finishes, aggregate, coatings, and solvents, among other options, onto a surface. In some examples, the sprayer is a handheld sprayer for fluids such as paint, varnish, water, oil, stains, finishes, coatings, and solvents, among others. In some examples, the sprayer can be a sprayer for a fixed industrial installation or automatic device.

Figure 1A:
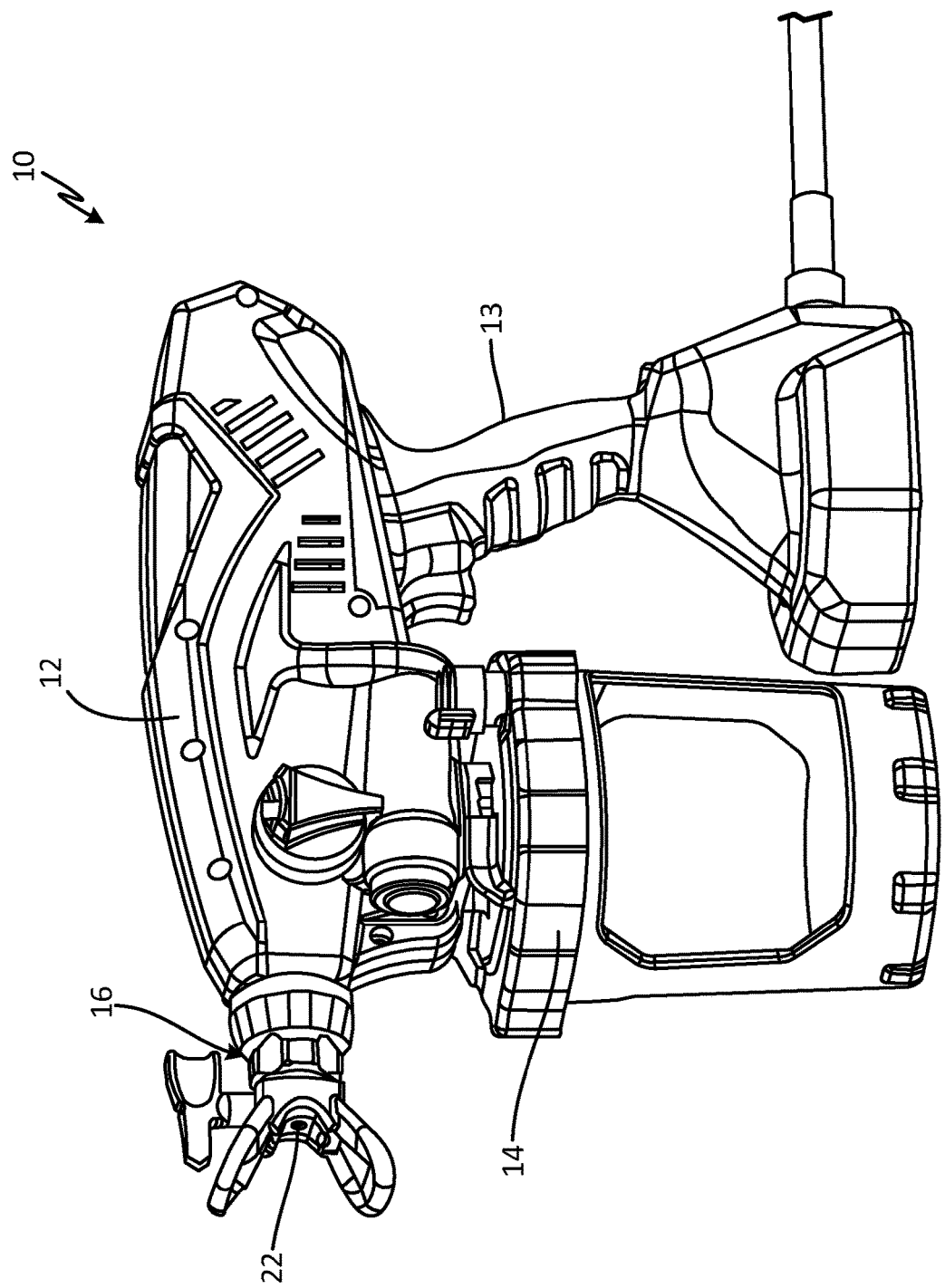
FIG. 1A is an isometric view of a sprayer.
Figure 1B:
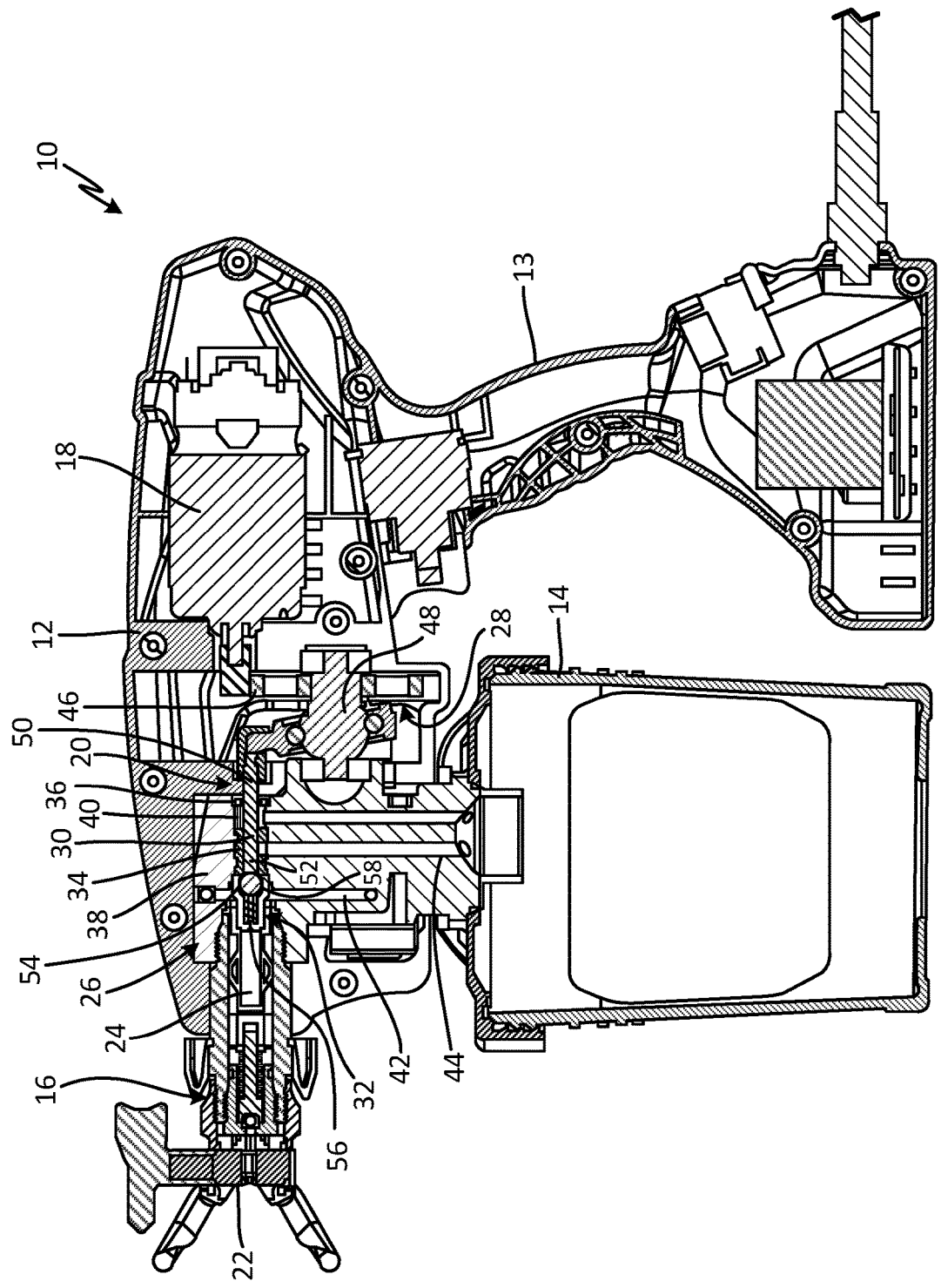
FIG. 1B is a cross-sectional view of a sprayer taken along line B-B in FIG. 1A.

FIG. 1A is a perspective view of sprayer 10. FIG. 1B is a cross-sectional view of sprayer 10 taken along line B-B in FIG. 1A. FIGS. 1A and 1B will be discussed together. Sprayer 10 includes housing 12, handle 13, reservoir 14, spray tip 16, motor 18, and pump 20. Spray tip 16 includes nozzle 22 and exit channel 24. Pump 20 includes pump body 26, drive 28, piston 30, check valve 32, cylinder 34, and seal 36. Pump body 26 includes cylinder housing 38, axial bore 40, radial bore 42, and intake channel 44. Drive 28 includes gear 46 and wobble (or swash) plate 48. Piston 30 includes upstream end 50 and downstream end 52. Check valve 32 includes cage 54, ball 56, and spring 58.

Reservoir 14 is mounted to housing 12 and configured to store a supply of fluid to be sprayed. Reservoir 14 can include a flexible polymer container within which the fluid is stored. While reservoir 14 is mounted to housing 12, it is understood that reservoir 14 can be remote from housing 12 and can provide fluid through a fluid line. Handle 13 is attached to housing 12 and can be integrally formed with housing 12. Handle 13 allows a user to operate sprayer 10 with a single hand. Spray tip 16 is disposed within housing 12. Nozzle 22 is disposed at a downstream end of spray tip 16 and is configured to spray fluid received from reservoir 14 onto a surface to be coated. Pump 20 is disposed in housing 12 between reservoir 14 and spray tip 16 and is configured to draw fluid from reservoir 14 and supply fluid to nozzle 22 through exit channel 24. Housing 12 can be of any suitable configuration for containing the various components of sprayer 10, such as a molded polymer clamshell.

Pump 20 is disposed within housing 12 and configure to draw fluid from reservoir 14 and drive the fluid downstream to nozzle 22. Pump body 26 is at least partially disposed within housing 12 and defines a flowpath for the fluid to flow between reservoir 14 and spray tip 16. Cylinder housing 38 forms a portion of pump body 26. Axial bore 40 extends through pump body 26 and cylinder housing 38, and cylinder 34 is disposed in axial bore 40 within cylinder housing 38. Intake channel 44 extends through pump body 26 between reservoir 14 and cylinder 34. Seal 36 is disposed at an upstream end of axial bore 40 and prevents fluid from leaking out of the upstream end of axial bore 40. In some examples, seal 36 can be a u-cup seal containing a pre-rolled o-ring. Radial bore 42 extends through pump body 26 and fluidly connects axial bore 40 with additional axial bores (discussed in detail in FIGS. 3A-3B) such that fluid supplied to any axial bore can flow to exit channel 24 and nozzle 22. Pump body 26 can be a polymeric structure and can be formed, for example, by injection molding. Axial bore 40, radial bore 42, and intake channel 44 can be formed by a mechanical removal process, such as drilling or machining. In some examples, pump body 26 can be formed through an additive manufacturing process such that axial bore 40, radial bore 42, and intake channel 44 are integrally formed in pump body 26.

Drive 28 is disposed within housing 12 and supported by housing 12 and pump body 26. Motor 18 is disposed in housing 12 and provides rotational power to drive 28. In some examples, motor 18 can be an electric motor, such as a brushed electric motor, a gas motor, or a pneumatic motor, among others. Gear 46 interfaces with and is directly driven by motor 18. In some examples, motor 18 is connected to gear 46 by interfacing gear teeth, but it is understood that motor 18 and gear 46 can be connected in any suitable manner, such as by a belt or chain. Wobble plate 48 is connected to and powered by gear 46, and wobble plate 48 converts the rotational movement of gear 46 into linear motion of piston 30. Drive 28 is thus configured to convert the rotational movement of motor 18 to linear, reciprocal motion of piston 30. While drive 28 is described as including gear 46 and wobble plate 48, it is understood that drive 28 can be of any suitable configuration for converting rotational movement into linear movement, such as various cranks and other devices.

Piston 30 extends from wobble plate 48 and into axial bore 40 through seal 36. Upstream end 50 of piston 30 is connected to wobble plate 48 and downstream end 52 of piston 30 is disposed within cylinder 34. An interface between piston 30 and cylinder 34 is formed such that piston 30 is tightly toleranced to cylinder 34 and such that fluid is prevented from leaking upstream around downstream end 52 of piston 30 by the interface between piston 30 and cylinder 34. Piston 30 is driven in a linear, reciprocating manner by wobble plate 48 to draw fluid into cylinder 34 through intake channel 44 and dispense the fluid downstream through exit channel 24 and nozzle 22. Piston 30 can be made of any suitable material for driving fluid from reservoir 14 to nozzle 22, such as carbide, among others. Cylinder 34 can similarly be made of carbide, among others.

Check valve 32 is disposed within pump body 26 at a downstream end of axial bore 40. Cage 54 is disposed within axial bore 40 between spray tip 16 and cylinder 34. In some examples, spray tip 16 secures cage 54 against cylinder 34 such that check valve 32 is retained within housing by spray tip 16. Ball 56 is disposed within cage 54, and spring 58 is disposed within cage 54 and biases ball 56 towards a closed position, where ball 56 abuts a downstream end of cylinder 34. Cylinder 34 thus provides the seat of check valve 32. While check valve 32 is described as including ball 56, it is understood that check valve can include any movable valve member suitable for creating a seal with cylinder 34 when in the closed position.

During operation, motor 18 is activated and rotatably drives gear 46. Gear 46 rotates and drives wobble plate 48, which in turn converts the rotary motion of gear 46 into linear, reciprocating motion of piston 30, such that piston 30 is driven through one or more pump cycles. During the pump cycle, piston 30 is drawn in a rearward direction through a suction stroke to draw the fluid into cylinder 34, and then piston 30 is driven in a forward direction through a pressure stoke to drive the fluid out of cylinder 34 and to nozzle 22.

During the suction stroke, piston 30 is drawn in the rearward direction creating a vacuum within cylinder 34 between check valve 32 and downstream end 52 of piston 30. When downstream end 52 of piston 30 passes intake channel 44, the vacuum draws the fluid from reservoir 14 into cylinder 34.

After completing the suction stroke, piston 30 is driven in the forward direction and through the pressure stroke. As piston 30 is driven in the forward direction, the pressure builds in the fluid within cylinder 34. The pressure continue to build until the pressure overcomes the force spring 58 exerts on ball 56, such that the pressure of the fluid unseats ball 56 from cylinder 34 causing ball 56 to shift from the closed position to an open position. With ball 56 unseated from cylinder 34 and in the open position, the fluid flows out of axial bore 40 through check valve 32, and flows to nozzle 22 through exit channel 24. As such, the fluid, which is typically noncompressible, exerts the force required to overcome the force exerted on ball 56 by spring 58, such that the fluid drives ball 56 from the closed position to the open position.

Prior to dispensing fluid, pump 20 is primed with the fluid from reservoir 14. Prior to priming, cylinder 34 is typically filled with air between check valve 32 and downstream end 52 of piston 30. During the pressure stroke, the air, which has little momentum and is compressible, is compressed between piston 30 and check valve 32 and may not create sufficient pressure to displace ball 56 from cylinder 34, such that ball 56 remains in the closed position and the air remains within cylinder 34 between ball 56 and downstream end 52.

To facilitate priming, piston 30 is dimensioned and driven such that downstream end 52 of piston 30 impacts ball 56 when ball 56 is seated on cylinder 34. Downstream end 52 of piston 30 impacting ball 56 unseats ball 56 from cylinder 34, providing a flowpath around ball 56 for the air disposed within cylinder 34 to exit cylinder 34 through check valve 32. With the air purged from cylinder 34, a sufficient vacuum can be created during the suction stroke to draw fluid into cylinder 34 from reservoir 14. With pump 20 primed, the fluid from reservoir 14 is drawn into and driven out of cylinder 34 during the pump cycle. Piston 30 can be configured to not impact ball 56 except during a priming stroke, as the pressure and momentum of the fluid from reservoir 14 unseats ball 56 before downstream end 52 of piston 30 reaches the seated position of ball 56.

Pump 20 provides significant advantages. Downstream end 52 of piston 30 impacts and unseats ball 56 during a priming stroke, facilitating quicker and more efficient priming of sprayer 10. Piston 30 automatically knocks ball 56 off of cylinder 34, which eliminates the need for a user to manually knock ball. For example, paint can dry between ball 56 and cylinder 34 causing ball 56 to stick to cylinder 34. Piston 30 can break the connection created by the dried paint by impacting ball 56 and driving ball 56 off of cylinder 34. Downstream end 52 impacting ball 56 also simplifies sprayer 10 by eliminating additional, separate components required to knock ball 56 off of cylinder 34. Further, downstream end 52 impacting ball 56 provides for a quicker and more efficient spraying process, as piston 30 knocks ball 56 off of the seat without the user having to disassemble sprayer 10, knock ball 56 off of the seat, and reassemble sprayer 10 before use.

Figure 2A:
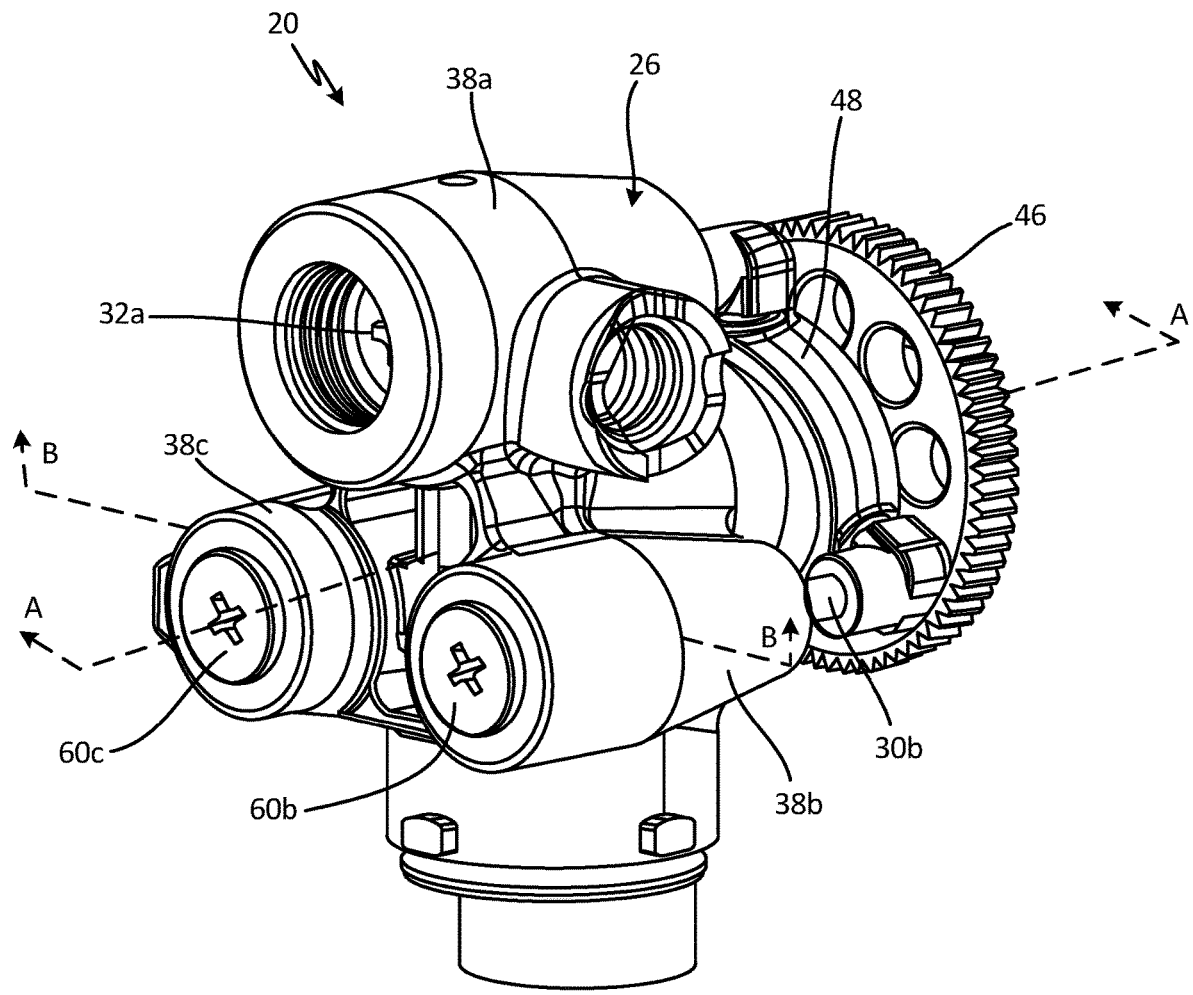
FIG. 2A is a front isometric view of a drive assembly for a sprayer.
Figure 2B:
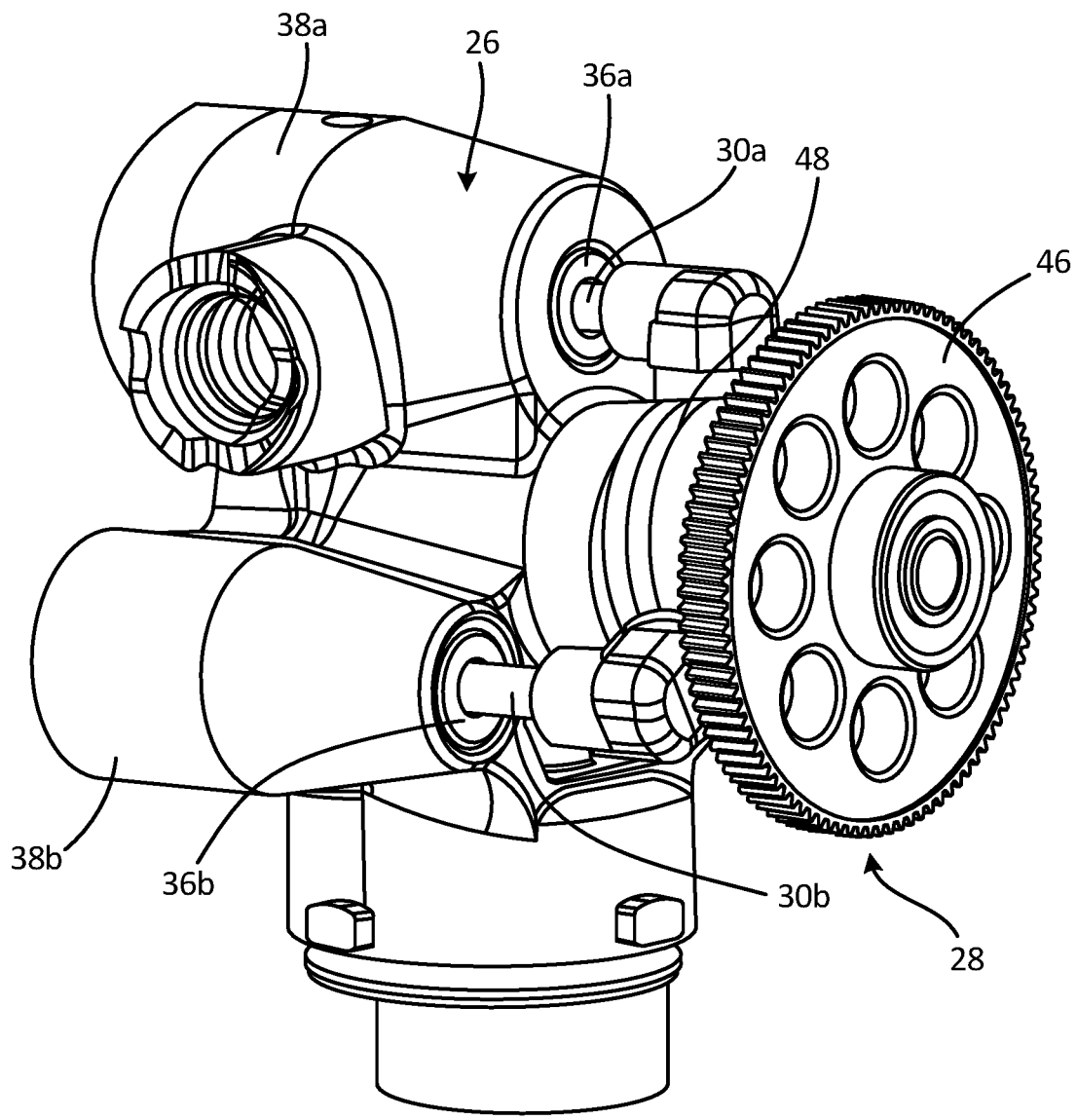
FIG. 2B is a rear isometric view of a drive assembly for a sprayer.

FIG. 2A is a front isometric view of pump 20. FIG. 2B is a rear isometric view of pump 20. FIGS. 2A and 2B will be discussed together. Pump body 26, drive 28, check valve 32a, piston 30a, piston 30b, seal 36a, seal 36b, retainer 60b and retainer 60c of pump 20 are shown. Cylinder housings 38a-38c of pump body 26 are shown. Drive 28 includes gear 46 and wobble plate 48.

Drive 28 is mounted on pump body 26, with gear 46 connected to and driving wobble plate 48. Pistons 30a-30c (piston 30c shown in FIG. 3B) extend from wobble plate 48 into cylinder housings 38a-38c, respectively. Retainer 60b is attached to a downstream end of cylinder housing 38b and retains check valve 32b (shown in FIG. 3B) within cylinder housing 38b. Similarly, retainer 60c is attached to a downstream end of cylinder housing 38c and retains check valve 32c (shown in FIG. 3C) within cylinder housing 38c. Retainer 60b and retainer 60c can be secured to cylinder housings 38b and 38c, respectively, in any suitable manner. For example, retainer 60b can be secured to cylinder housing 38b by interfacing threading on retainer 60b and cylinder housing 38b. Similarly, retainer 60c can be secured to cylinder 34 housing 12c by interfaced threading on retainer 60c and cylinder housing 38c. Cylinder housing 38a is configured to receive a spray tip, such as spray tip 16 (shown in FIG. 1B), to retain check valve 32a within cylinder housing 38a. The spray tip can be secured to cylinder housing 38a in any desired manner, such as by interfaced threading on the spray tip and cylinder housing 38a.

Seals 36a-36c are disposed at an upstream end of cylinder housings 38a-38c, respectively. Pistons 30a-30c extend into cylinder housings 38a-38c through seals 36a-36c. Seals 36a-36c are configured to prevent fluid from leaking out of the upstream ends of cylinder housings 38a-38c during operation. Seals 36a-36c can be of any suitable configuration for sealing the upstream end of cylinder housings 38a-38c. In some examples, seals 36a-36c can be u-cup seals containing pre-rolled o-rings.

During operation, gear 46 is rotationally driven, and gear 46 drives wobble plate 48. Wobble plate 48 drives pistons 30a-30c in a linear, reciprocating manner. Pistons 30a-30c draw fluid into cylinder housings 38a-38c, respectively, and drive the fluid downstream out of cylinder housing 38a. For example, wobble plate 48 can pull piston 30b in the upstream direction, causing piston 30b to enter a suction stroke and to draw fluid into cylinder housing 38b. Wobble plate 48 can then push piston 30b in the downstream direction, whereby piston 30b ejects the fluid from cylinder housing 38b. The fluid exits cylinder housing 38b and flows to cylinder housing 38a through internal flowpaths (discussed in more detail in FIGS. 3A-3B) in pump body 26. The fluid is provided downstream from cylinder housing 38a to a spray nozzle, such as nozzle 22 (best seen in FIG. 1B), where the fluid can be applied to a surface. Similarly, piston 30c can draw fluid into cylinder housing 38c and eject the fluid such that the fluid flows from cylinder housing 38c to cylinder housing 38a through internal flowpaths in pump body 26. Piston 30a is configured to draw fluid directly to cylinder housing 38a and to drive the fluid downstream out of cylinder housing 38a to the spray nozzle. The fluid drawn into pump body 26 by each of pistons 30a-30c can thus be output through a common exit port. In some examples, the common exit port can be cylinder housing 38a.

Figure 3A:
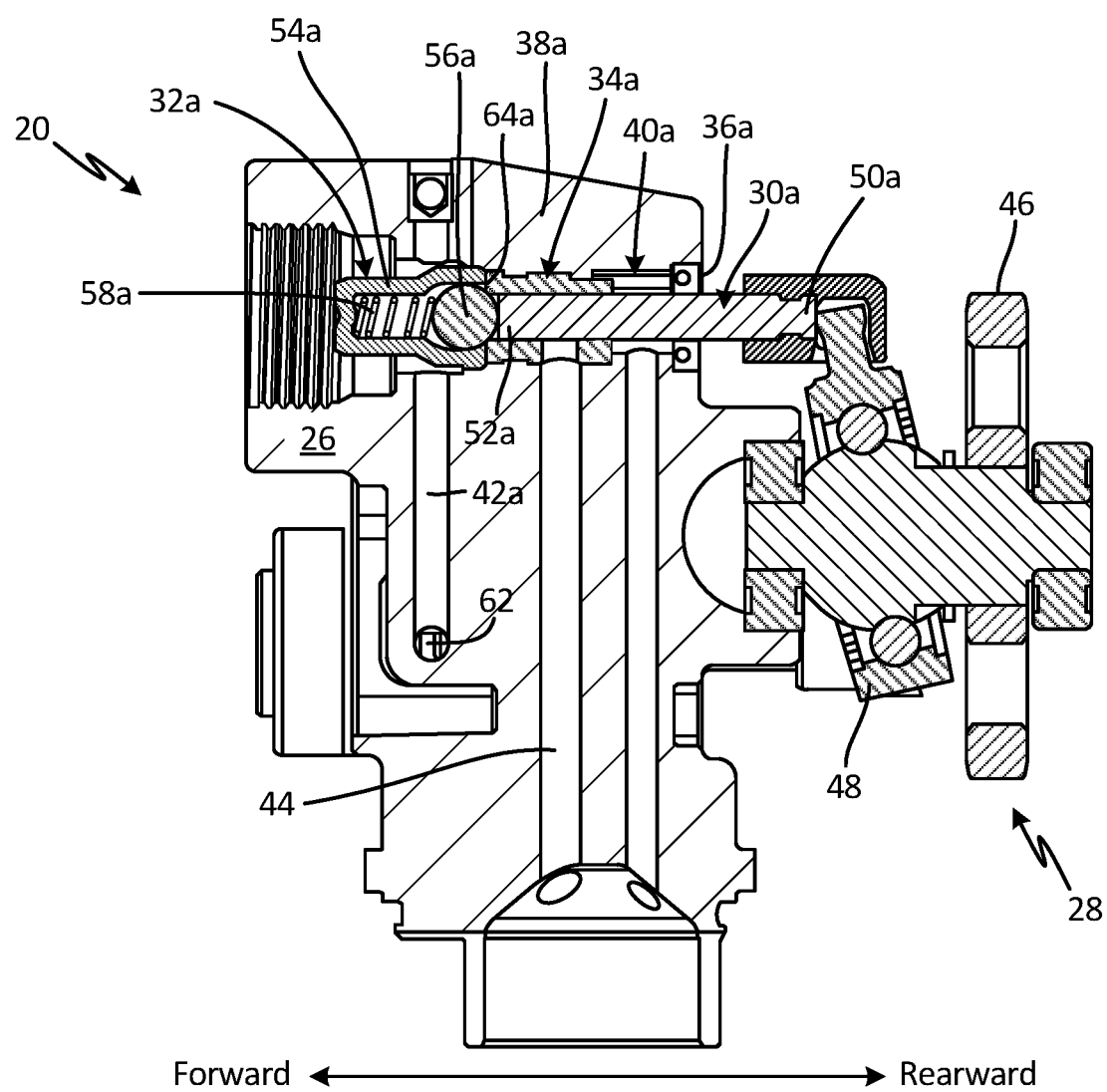
FIG. 3A is a cross-sectional view of a drive assembly for a sprayer taken along line A-A in FIG. 2A.
Figure 3B:
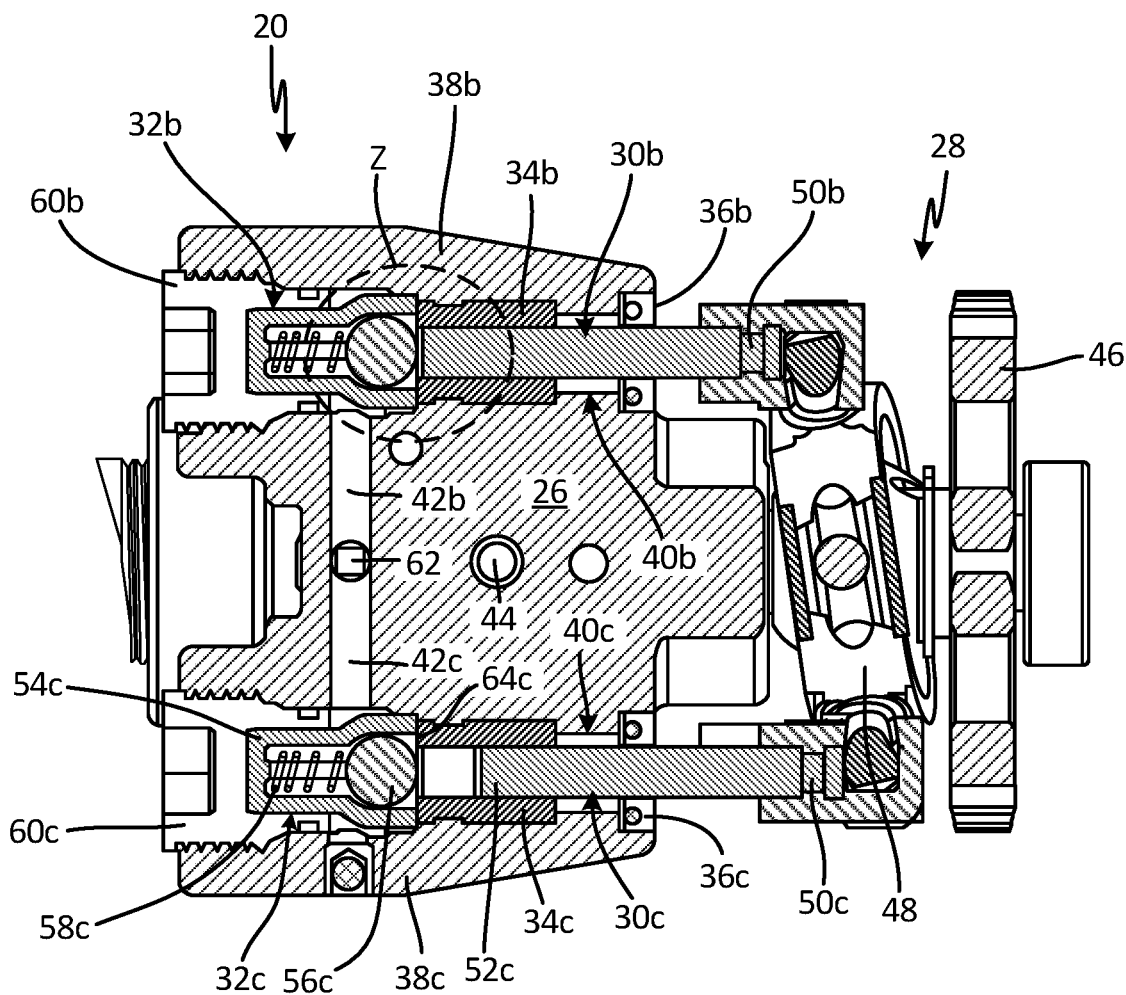
FIG. 3B and FIG. 3D are a cross-sectional view of a drive assembly for a sprayer taken along line B-B in FIG. 2A.
Figure 3C:
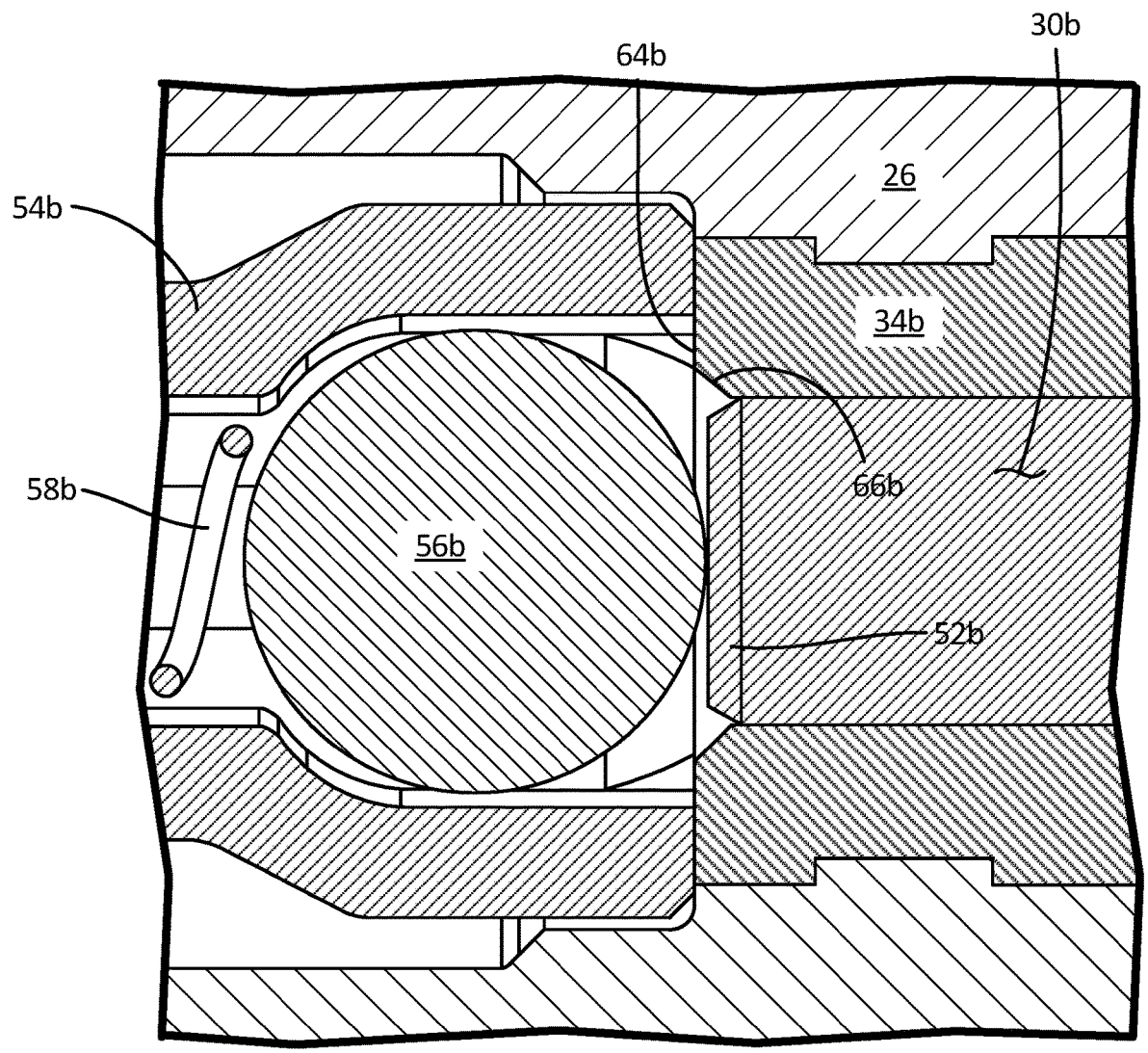
FIG. 3C is an enhanced view of detail Z in FIG. 3B.
Figure 3D:
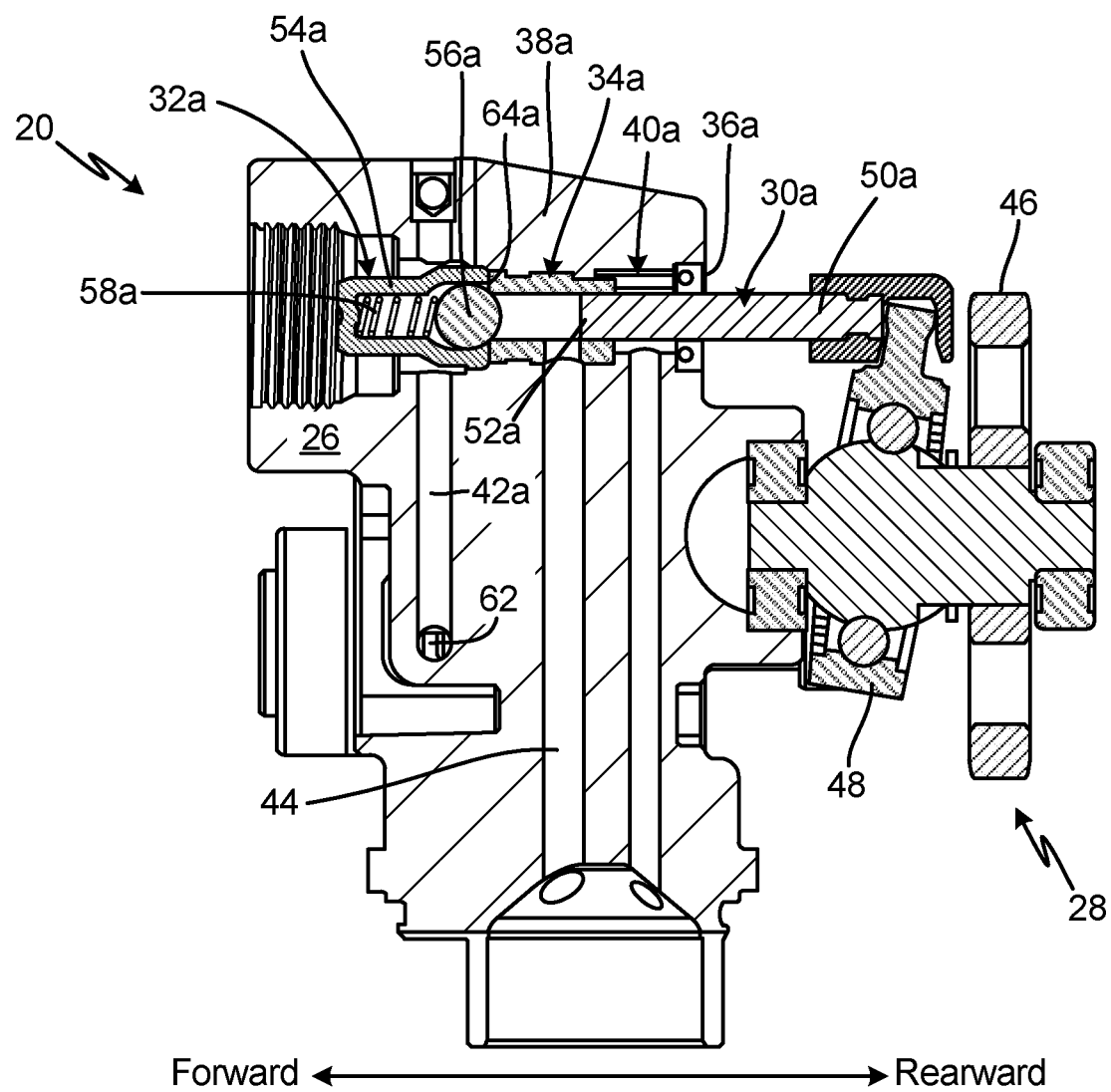

FIG. 3A is a cross-sectional view of pump 20 taken along line A-A in FIG. 2A. FIG. 3B is a cross-sectional view of pump 20 taken along line B-B in FIG. 2B. FIG. 3C is an enhanced view of detail Z in FIG. 3B. FIGS. 3A-3C will be discussed together. Pump 20 includes pump body 26, drive 28, pistons 30a-30c (collectively "pistons 30"), check valves 32a-32c (collectively "check valves 32"), cylinders 34a-34c (collectively "cylinders 34"), seals 36a-36c (collectively "seals 36"), and retainers 60b-60c (collectively "retainers 60"). Pump body 26 includes cylinder housings 38a-38c (collectively "cylinder housings 38"), axial bores 40a-40c (collectively "axial bores 40"), radial bores 42a-42c (collectively "radial bores 42"), inlet channels 44 (only one of which is shown), and intersection point 62. Drive 28 includes gear 46 and wobble plate 48. Pistons 30a-30c respectively include upstream ends 50a-50c (collectively "upstream ends 50") and downstream ends 52a-52c (collectively "downstream ends 52"). Check valves 32a-32c respectively include cages 54a-54c (collectively "cages 54"), balls 56a-56c (collectively "balls 56"), and springs 58a-58c (collectively "springs 58"). Cylinders 34a-34c respectively include downstream faces 64a-64c (collectively "downstream faces 64"), and downstream faces 64a-64c respectively include sealing lips 66a-66c (only sealing lip 66b is shown).

Cylinder housings 38 form portions of pump body 26 through which fluid is pumped. Axial bores 40 extend through cylinder housings 38, and cylinders 34 are disposed in cylinder housings 38 within axial bores 40. Radial bores 42 extend between axial bores 40 and intersection point 62. In some examples, radial bores 42 extend into axial bores 40 at a location downstream of cylinders 34. Radial bores 42 provide passageways through pump body 26 that fluidly connect axial bores 40 to provide fluid to a single exit port, such as through spray tip 16 (shown in FIG. 1B). In some examples, cylinders 34 can be integrally retained within cylinder housings 38. For example, cylinder housings 38 can be formed around cylinders 34, such as by insert molding. Cylinders 34 are shown as unitary parts. It is understood, however, that cylinders 34 can be formed from one or more components. For example, cylinders 34 can include a downstream portion and an upstream portion that are formed separately. In some examples, the upstream portion and the downstream portion are formed from different materials. In other examples, the upstream portion and the downstream portion can be formed from the same material. In one example where cylinders 34 are formed of multiple components, the downstream portion can form the seat of check valves 32, and the upstream portion can be disposed within axial bores 40. The upstream portion and the downstream portion can be formed integrally within pump body 26, can be separate from pump body 26, can be removable from pump body 26, or can be some combination thereof.

Intake channel 44 extends through pump body 26 to axial bore 40a and is configured to supply fluid to axial bore 40a from a fluid source, such as reservoir 14 (shown in FIGS. 1A-1B). It is understood that pump body 26 can include one or more additional inlet channels (not shown) extending between the fluid source and axial bore 40b and axial bore 40c. For example, the additional inlet channels can extend to axial bore 40b and axial bore 40c independent of intake channel 44. In some examples, the additional inlet channels can extend to axial bore 40b and axial bore 40c from intake channel 44, such that the additional inlet channels branch from intake channel 44.

Drive 28 is mounted to pump body 26. Gear 46 is attached to and powers wobble drive 28. Gear 46 is configured for rotation, and wobble plate 48 is configured to convert the rotational motion of gear 46 into linear, reciprocal motion of pistons 30. Pistons 30 are attached to wobble plate 48 and extend into axial bores 40. Upstream ends 50 of pistons 30 are attached to wobble drive 28, and downstream ends 52 of pistons 30 are disposed within cylinders 34. Seals 36 are disposed at an upstream end of axial bores 40, and seals 36 extend around pistons 30. Seals 36 are configured to prevent fluid from leaking out the upstream ends of axial bores 40, and seals 36 can be of any suitable configuration for sealing axial bores 40. For example, seals 36 can be u-cup seals having pre-rolled o-rings.

Check valves 32 are disposed within axial bores 40 downstream of cylinders 34. Retainer 60*b* is disposed at a downstream end of axial bore 40*b* and at least partially seals axial bore 40*b*. More specifically, check valve 32*b* is retained within axial bore 40*b* by retainer 60*b*. Similarly, retainer 60*c* is disposed at a downstream end of axial bore 40*c* and at least partially seals axial bore 40*c*, and check valve 32*c* is retained within axial bore 40*c* by retainer 60*c*. In some examples, retainer 60*b* and retainer 60*c* include threading configured to mate with threading on axial bore 40*b* and axial bore 40*c*, respectively. It is understood, however, that retainer 60*b* and retainer 60*c* can be secured within axial bore 40*b* and axial bore 40*c* in any suitable manner, such as by friction fitting or welding. In some examples, check valve 32*a* is retained within axial bore 40*a* by a spray tip for a sprayer, such as spray tip 16 (shown in FIG. 1B).

Cages 54 of check valves 32 are disposed in axial bores 40 adjacent a downstream face of cylinders 34. Springs 58 are disposed in cages 54 and are configured to bias balls 56 towards the closed position. Balls 56 are at least partially disposed in cages 54 and abut the downstream faces 64 of cylinders 34 when in a closed position. More specifically, balls 56 can abut sealing lips 66 of downstream faces 64 when in the closed position. Sealing lips 66 can is contoured to match a contour of balls 56, thereby facilitating sealing of balls 56 on downstream faces 64. Sealing lips 66 can be tapered, concave, or of any other desired configuration for facilitating sealing with balls 56. With balls 56 in the closed position, check valves 32 prevent fluid from flowing downstream from cylinders 34. In the closed position, balls 56 can at least partially extend into cylinders 34, such that at least a portion of each ball 56 is disposed upstream of the downstream face of an associated cylinder 34.

The pumping cycles of pistons 30*a*-30*c*, which include a suction stroke and a pumping stoke, are substantially similar, and will be discussed generally. During operation, gear 46 is rotatably driven and drives wobble plate 48, which in turn converts the rotary motion of gear 46 into linear reciprocating motion of pistons 30. In a suction stoke, pistons 30 are drawn upstream through cylinders 34, creating a vacuum within cylinders 34 between check valves 32 and downstream ends 52 of pistons 30. Pistons 30 are pulled in the upstream direction until downstream end 52 passes a channel providing fluid to that cylinder 34, whereupon the vacuum draws fluid into cylinder 34.

After completing the suction stroke, pistons 30 enter the pressure stroke, where wobble plate 48 drives pistons 30 in the downstream direction through cylinders 34. As pistons 30 are driven in the downstream direction, the pressure builds in the fluid within cylinders 34 until the pressure overcomes the force of springs 58, unseating balls 56 from the downstream faces of cylinders 34. With balls 56 unseated from cylinders 34, the fluid flows out of cylinders 34 through check valves 32 and to a dispensing nozzle, such as nozzle 22 (shown in FIGS. 1A-1B).

As shown specifically in FIG. 3B, fluid flowing out of cylinder 34*b* through check valve 32*b* enters radial bore 42*b*. Similarly, the fluid flowing out of cylinder 34*c* through check valve 32*c* enters radial bore 42*c*. The fluid flows through radial bore 42*b* or radial bore 42*c* to intersection point 62. From intersection point 62, the fluid flows through radial bore 42*a* and is provided to axial bore 40*a*, at a location downstream of cylinder 34*a*. Providing the fluid to axial bore 40*a* at a location downstream of cylinder 34*a* prevents check valve 32*a* from inhibiting the flow of fluid from either axial bore 40*b* or axial bore 40*c*.

Prior to dispensing fluid, pump 20 is primed with the fluid to be sprayed. Prior to priming, cylinders 34 are filled with air, which can inhibit the proper uptake of fluid into cylinders 34 such that pump 20 will not be properly primed. As pistons 30 are driven in the forward direction through the priming stroke, the air is compressed within cylinders 34 between balls 56 and downstream ends 52 of pistons 30. The pressure generated by compressing the air in cylinders 34 may fail to rise to a sufficient level to overcome the force of springs 58 maintaining balls 56 in the closed position. As such, balls 56 may not unseat from sealing lips 66 due to the air pressure alone. In some cases, balls 56 can adhere to sealing lips 66 due to the fluid being pumped, such as paint, drying between balls 56 and sealing lips 66. To ensure efficient priming, pistons 30 are dimensioned to impact and displace ball 56, or any other valve element of check valves 32, from downstream face 64 as pistons 30 proceed forward through a priming stroke. Displacing balls 56 from sealing lips 66 allows the air to exit cylinders 34 through check valves 32. After pump 20 is primed, the pressure generated by the fluid between pistons 30 and check valves 32 is sufficient to unseat balls 56. As such, pistons 30 can be configured to impact and unseat balls 56 only during priming. Having pistons 30 impact balls 56 only during priming minimizes any wear on balls 56 due to contact with pistons 30.

The priming strokes of pistons 30*a*-30*c* are substantially similar, and the priming stroke of piston 30*b* will be discussed in more detail. A priming stroke is a pressure stroke that occurs prior to pump 20 being primed. In FIG. 3C, piston 30*b* is shown at a forward extent of a priming stroke and is in contact with ball 56*b*. During the priming stroke, piston 30*b* is driven forward and downstream end 52*b* impacts ball 56*b*, displacing ball 56*b* from sealing lip 66*b* of cylinder 34*b*. Displacing ball 56*b* from sealing lip 66*b* of cylinder 34*b* opens a gap between ball 56*b* and sealing lip 66*b* through which the air can be ejected from cylinder 34*b*. After completing the priming stroke, piston 30*b* reverses stroke direction and begins the suction stroke. Ball 56*b* can reseat on sealing lip 66*b* and the vacuum can be created within cylinder 34*b*, facilitating priming of pump 20.

In some examples, downstream ends 52 of pistons 30 remains upstream of downstream faces 64 of cylinders 34 when pistons 30 is in the forward-most position of the priming cycle. With downstream ends 52 upstream of downstream faces 64, balls 56 are positioned on downstream faces 64 such that a portion of ball extends into cylinders 34, so downstream faces 64 of pistons 30 can impact and unseat balls 56 from cylinders 34 when pistons 30 are in the forward-most position. In some examples, downstream ends 52 of pistons 30 are aligned with downstream faces 64 of cylinders 34 when pistons 30 are in the forward-most position. In some other examples, downstream ends 52 of pistons 30 project beyond downstream faces 64 of cylinders 34 and into check valves 32 when pistons 30 are in the forward-most position. In each example, downstream ends 52 are configured to impact and unseat balls 56 from the closed position during the priming cycle.

Pump 20 provides significant advantages. Pistons 30 automatically knock balls 56, or any valve member of a different configuration, out of a closed position during priming. Automatically knocking balls 56 out of the closed position eliminates additional components that were required to knock balls 56 from the closed position, thereby simplifying pump 20 and providing for quicker, more efficient priming. Furthermore, configuring pistons 30 to knock balls 56 during priming but not during pumping prevents excessive wear on balls 56 from contact with downstream ends 52 of pistons 30, thereby providing a longer lifespan for components of pump 20.

Figure 4A:
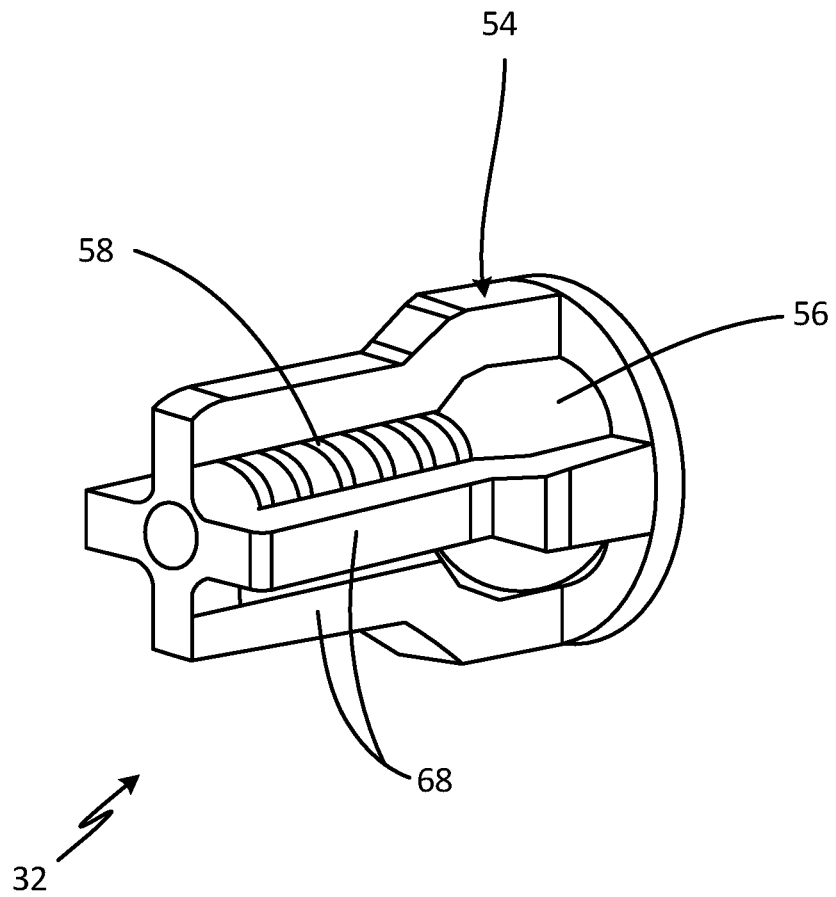
FIG. 4A is an isometric view of a check valve.
Figure 4B:
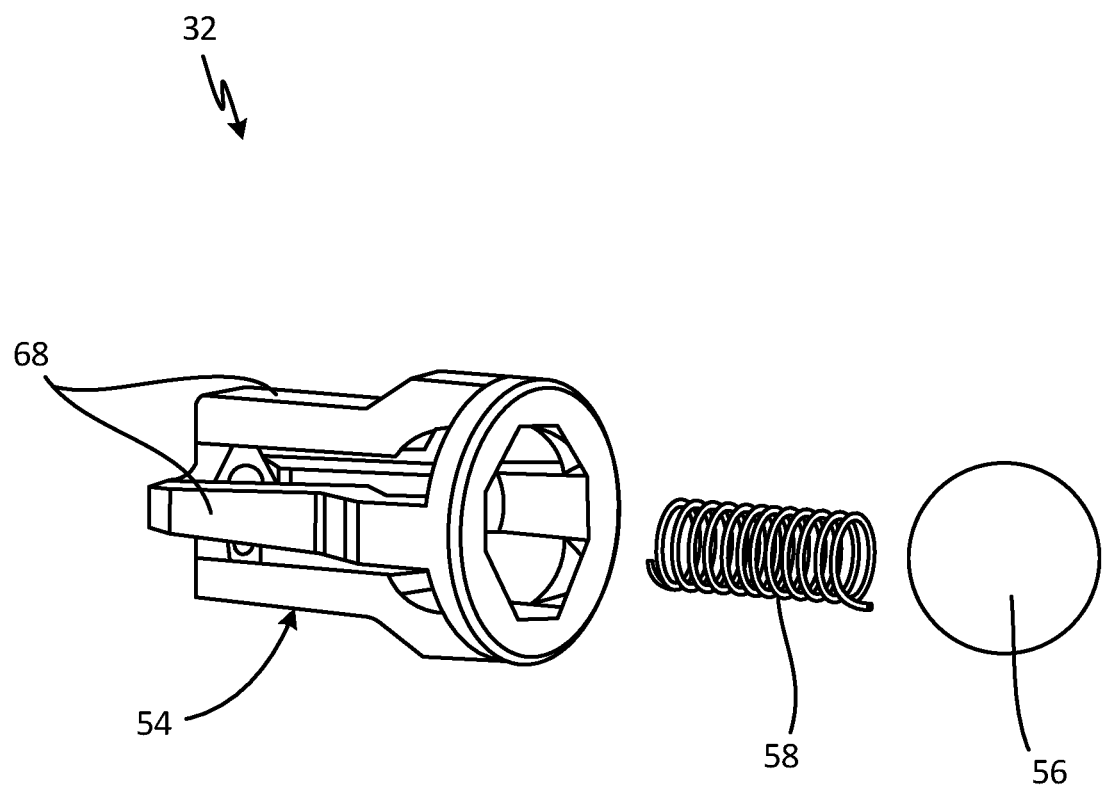
FIG. 4B is an exploded view of a check valve.

FIG. 4A is an isometric view of check valve 32. FIG. 4B is an exploded view of check valve 32. FIGS. 4A and 4B will be discussed together. Check valve 32 includes cage 54, ball 56, and spring 58. Cage 54 includes ligaments 68. Spring 58 is disposed within cage 54 and is configured to bias ball 56 out of cage 54. Ligaments 68 provide support for cage 54 and retain spring 58 within cage 54. Ligaments 68 further define gaps extending between ligaments 68 through which fluid can exit check valve 32. Cage 54 serves as a downstream stop for ball 56 such that ball 56 can displace into cage 54 a set distance before cage 54 prevents further progress of ball 56. With ball 56 displaced into cage 54, fluid can flow around ball 56, into cage 54, and can exit cage 54 and flow downstream through the gaps between ligaments 68.

Figure 5:
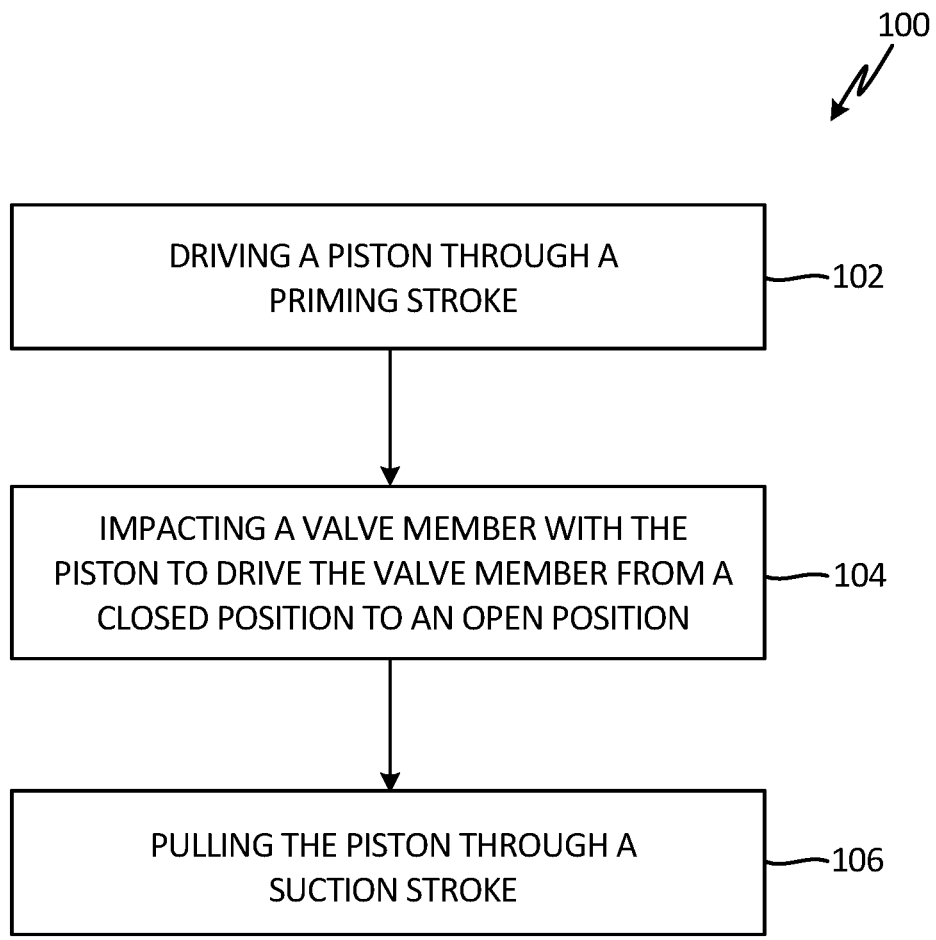
FIG. 5 is a flowchart of a method of priming a pump.

FIG. 5 is a flow chart of method 100 of priming a pump. In step 102, a piston, such as pistons 30 (best seen in FIGS. 3A-3B) is driven through a priming stroke. For example, rotary motion from a motor, such as motor 18 (shown in FIG. 1B), can be converted to linear, reciprocal motion of the piston by a drive, such as drive 28 (best seen in FIGS. 3A-3B). The priming stroke is a pressure stroke of the piston that occurs prior to the pump being primed.

In step 104, a downstream end of the piston impacts a valve member, such as balls 56 (best seen in FIGS. 3A-3B), of a check valve, such as check valves 32 (best seen in FIGS. 3A-3B), and drives the valve member from a closed position to an open position. Driving the valve member to the open position provides an ejection flowpath through the check valve through which any air trapped between the check valve and the piston can be ejected.

In step 106, the piston is pulled through a suction stroke. With the air ejected from the pump, a vacuum can form between the piston and the check valve during the suction stroke. When the downstream end of the piston passes an intake, the vacuum draws pumped fluid into the chamber between the check valve and the piston. The pump is thus primed and ready to dispense fluid. In one example, the pump is a pump for a sprayer, such as sprayer 10, and the fluid can be applied to a surface with the sprayer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump comprising:
   a first piston at least partially disposed within a first cylinder, the first piston having a downstream end movable within the first cylinder; and
   a first check valve disposed at an exit of the first cylinder, the first check valve including a first valve member;
   wherein the first piston, the first cylinder, and the first check valve are configured such that the downstream end of the first piston impacts the first valve member to drive the first valve member from a closed position to an open position during a priming stroke of the first piston, and such that fluid being expelled from within the first cylinder by the first piston during a pressure stroke of the first piston when the pump is primed drives the first valve member from the closed position to the open position such that the downstream end does not impact the first valve member during the pressure stroke of the first piston;
   wherein an interface between the first piston and the cylinder during reciprocation of the first piston prevents fluid within the first cylinder from flowing between the first piston and the cylinder and away from the first check valve; and
   wherein the first piston covers an opening through the cylinder at an end of the pressure stroke, the cylinder configured to receive the pumped fluid from an inlet through the opening, and wherein the opening is at least partially disposed between the downstream end of the first piston and the check valve with the first piston at an end of the suction stroke.

2. The pump of claim 1, wherein:
   the first piston is drawn rearward through the first cylinder during a suction stroke and is configured to draw a fluid into the first cylinder during the suction stroke; and
   the first piston is driven forward through the first cylinder during the pressure stroke and is configured build a pressure in the fluid and drive the fluid downstream out of the first cylinder through the first check valve during the pressure stroke.

3. The pump of claim 2, wherein the first piston is sized such that the downstream end of the first piston does not impact the first valve member during both the suction stroke and the pressure stroke.

4. The pump of claim 1, wherein the first cylinder is disposed in a first axial bore.

5. The pump of claim 1, wherein a downstream face of the first cylinder forms a seat for the first valve member such that the first valve member contacts the downstream face when the first valve member is in the closed position.

6. The pump of claim 5, wherein the downstream end of the first piston is one of aligned with the downstream face of the first cylinder with the first piston in a forward-most position and disposed within the first cylinder upstream of the downstream face of the first cylinder with the piston in the forward-most position.

7. The pump of claim 1, wherein the first valve member is a ball.

8. The pump of claim 7, wherein the first check valve further comprises:
   a cage, the ball at least partially disposed within the cage; and
   a spring disposed within the cage and configured to urge the ball towards the closed position.

9. The pump of claim 7, wherein a downstream face of the first cylinder includes a sealing lip configured to mate with a curvature of the ball such that a portion of the ball extends into the first cylinder.

10. The pump of claim 1, further comprising:
a second piston disposed within a second cylinder, the second piston having a downstream end movable within the second cylinder;
a second check valve disposed at an exit of the second cylinder, the second check valve including a second valve member;
wherein the second piston extends into the second cylinder, and wherein a downstream face of the second cylinder forms a seat for the second valve member such that the second valve member contacts the downstream face when the second valve member is in the closed position; and
wherein the downstream end of the second piston is configured to impact the second valve member to drive the second valve member from a closed position to an open position during a priming stroke of the second piston;
wherein the second piston is drawn upstream through the second cylinder during a suction stroke and is configured to draw a fluid into the second cylinder during the suction stroke; and
wherein the second piston is driven downstream through the second cylinder during a pressure stroke and is configured to build a pressure in the fluid and drive the fluid downstream out of the second cylinder through the second check valve during the pressure stroke.

11. The pump of claim 10, further comprising:
a first valve retainer secured within a downstream end of a second axial bore within which the second cylinder is disposed, the first valve retainer configured to retain the second check valve within the second axial bore.

12. The pump of claim 10, wherein the second piston does not impact the second valve member during either of the suction stroke and the pressure stroke of the second piston.

13. A fluid spraying system comprising:
a sprayer configured to spray a pumped fluid through a spray tip;
a reservoir connected to the sprayer and configured to store a supply of the pumped fluid; and
a pump configured to draw the fluid from the reservoir and drive the pumped fluid downstream to the spray tip, the pump comprising:
a cylinder;
an inlet configured to receive the pumped fluid from the reservoir;
a piston extending into the cylinder, the piston having an upstream end connected to a drive and a downstream end configured to reciprocate within the cylinder, the piston configured to draw the pumped fluid from the reservoir during a suction stroke and to drive the pumped fluid downstream to the spray tip during a pressure stroke; and
a check valve configured to control flow of the pumped fluid downstream from the cylinder, the check valve including a valve member;
wherein the piston, the cylinder, and the check valve are configured such that the downstream end of the piston impacts the valve member to drive the valve member from a closed position to an open position during a priming stroke of the piston, and such that fluid being expelled from within the cylinder by the piston during a pressure stroke of the piston when the pump is primed drives the valve member from the closed position to the open position such that the downstream end of the piston does not impact the valve member during the pressure stroke of the piston;
wherein the piston covers an opening through the cylinder at an end of the pressure stroke, the cylinder configured to receive the pumped fluid from the inlet through the opening, and wherein the opening is at least partially disposed between the downstream end of the piston and the check valve with the piston at an end of the suction stroke.

14. The fluid spraying system of claim 13, wherein a portion of the cylinder disposed between the downstream end of the piston and the valve member is devoid of the pumped fluid during the priming stroke.

15. The fluid spraying system of claim 14, wherein:
the piston is drawn upstream through the cylinder by the drive during the suction stroke, and the piston is configured to draw the pumped fluid from the reservoir and into the cylinder during the suction stroke;
the piston is driven downstream through the cylinder by the drive during the pressure stroke, and the piston is configured to drive the pumped fluid downstream from the cylinder through the check valve during the pressure stroke; and
the downstream end is configured to not contact the valve member during the suction stroke and the pressure stroke.

16. The fluid spraying system of claim 15, wherein the cylinder is disposed within an axial bore in a pump body of the pump, wherein the piston extends into the cylinder, and wherein a downstream face of the cylinder forms a seat for the valve member such that the valve member contacts the downstream face when the valve member is in the closed position.

17. The fluid spraying system of claim 13, wherein the downstream end of the piston is one of aligned with the downstream face of the cylinder when the piston is in a forward-most position and disposed upstream of the downstream face of the cylinder when the piston is in the forward-most position.

18. The fluid spraying system of claim 13, wherein the drive comprises:
a gear configured to be rotatably driven by a motor mounted in a housing; and
a wobble drive powered by the gear and configured to convert the rotational movement from the gear to a linear movement of the piston.

19. A method of priming a pump, the method comprising:
driving a piston in a first direction within a cylinder and through a priming stroke, wherein a portion of the cylinder between a downstream end of the piston and a downstream face of the cylinder is devoid of a pumped fluid during the priming stroke;
impacting, during the priming stroke, a valve member with the downstream end of the piston to drive the valve member from a closed position to an open position;
pulling the piston in a second direction opposite the first direction and through a suction stroke to draw the pumped fluid from a reservoir and into the portion of the cylinder between the downstream end of the piston and the downstream face of the cylinder and through an opening in the cylinder, the opening disposed at least partially between the downstream end of the piston and the downstream face of the cylinder with the piston at an end of the suction stroke;

driving the piston in the first direction within the cylinder and through a pressure stroke; and building pressure in the pumped fluid in the cylinder by the piston moving in the first direction through the cylinder, such that the pumped fluid drives the valve member from the closed position to the open position;

wherein the piston does not contact the valve member during the pressure stroke.

\* \* \* \* \*